(12) United States Patent
Sarkar et al.

(10) Patent No.: US 7,830,854 B1
(45) Date of Patent: *Nov. 9, 2010

(54) VARIABLE AUXILIARY PILOT TRIGGER AND PERFORMANCE

(75) Inventors: Debasish Sarkar, Irvine, CA (US); Sachin R. Vargantwar, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/243,070

(22) Filed: Oct. 1, 2008

(51) Int. Cl.
*H04B 7/216* (2006.01)
*H04W 4/00* (2009.01)

(52) U.S. Cl. .................. 370/342; 370/320; 370/328; 370/331; 370/335

(58) Field of Classification Search .............. 370/320, 370/328, 331, 335, 342
See application file for complete search history.

(56) References Cited

U.S. PATENT DOCUMENTS

2004/0218559 A1* 11/2004 Kim et al. .................. 370/318

OTHER PUBLICATIONS

Unpublished U.S. Appl. No. 12/432,311, entitled "Dynamic Payload-Size Threshold for Triggering an Auxiliary Pilot" filed Apr. 29, 2009 in the name of Sachin R. Vargantwar et al.
Unpublished U.S. Appl. No. 12/569,120, entitled "Enhanced Reverse Link Auxiliary Pilot Trigger" filed Sep. 29, 2009 in the name of Hemanth Pawar et al.
Unpublished U.S. Appl. No. 12/478,827, entitled "Reverse Noise Rise Based Payload Threshold Determination for Auxiliary Pilot Trigger" filed Jun. 5, 2009 in the name of Siddharth Oroskar et al.
Unpublished U.S. Appl. No. 12/634,818, entitled "Auxiliary Pilot Trigger Based on Latency" filed Dec. 10, 2009 in the name of Debasish Sarkar et al.

* cited by examiner

*Primary Examiner*—Ronald Abelson

(57) ABSTRACT

A method and system is disclosed for triggered operation of a variable auxiliary pilot based on RF conditions. An access terminal operating in a wireless communication system may switch on its auxiliary pilot in response to receiving a first threshold number of power-up commands from a serving base station. Responsive to thereafter receiving each of a second threshold number of power-up commands, the access terminal may increment the gain of its auxiliary pilot while holding the gain of its primary pilot fixed. The access terminal thereby sets its auxiliary pilot gain independently of its primary pilot gain for a select number of power-control commands. The access terminal may respond to subsequent power-control commands by responsively adjusting the gain of it primary pilot, and linking the gain of its auxiliary pilot to the gain of its primary pilot. Upon receiving a third threshold number of power-down commands, the access terminal may switch off its auxiliary pilot.

27 Claims, 9 Drawing Sheets

VARIABLE AUXILIARY PILOT TRIGGER AND PERFORMANCE

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennae. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Data on either link are encoded by the sender and decoded by the receiver. To facilitate decoding, the sender also transmits a beacon or "pilot" signal that, among other functions, provides the receiver with a timing reference for other signals transmitted by the sender. Under certain conditions, an AT can transmit on its reverse link a secondary beacon, or "auxiliary" pilot, that boosts the power of its "primary" pilot, and thereby enhances the reliability of the base station's timing reference for the AT. However, in conventional operation, the power level of the auxiliary pilot is set as a function of the power level of the primary pilot in a manner that lacks flexibility in terms of the relative power levels of each pilot, and that fails to fully account for the dynamic nature of the RF conditions under which the AT may be operating.

Accordingly, embodiments of the present invention provide triggered operation of a variable auxiliary pilot in an access terminal.

Hence in one respect, various embodiments of the present invention provide, in an access terminal operating in a wireless communication system that includes a base station, a method comprising: on an air interface communication link from the access terminal to the base station, transmitting a primary beacon signal at a first power level to the base station, wherein the primary beacon signal is used by the base station to maintain a common timing reference between the access terminal and the base station, the common timing reference facilitating decoding by the base station of other signals received from the access terminal; setting a second power level: (i) by adjusting the second power level independently of the first power level according to power-control commands received at the access terminal from the base station, and (ii) to a value selected from a plurality of different, non-zero power levels, and a zero power level; and on the air interface communication link from the access terminal to the base station, and concurrent with transmission of the primary beacon signal at the first power level, transmitting a secondary beacon signal to the base station at the second power level, wherein the secondary beacon signal is used by the base station to enhance reliability of the common timing reference.

In another respect, various embodiments of the present invention provide, in an access terminal operating in a wireless communication system that includes a base station, wherein the access terminal and the wireless communication system both operate at least according to a IS-856, and the base station issues power-up and power-down commands according to inner-loop power-control protocols, a method comprising: at the access terminal, receiving a trigger to begin transmitting an auxiliary pilot signal, wherein when the trigger is received an auxiliary power level is at zero and a primary power level is at a current primary power level; and responsive to thereafter receiving from the base station a post-trigger number of consecutive power-up commands, wherein the post-trigger number is no greater than a post-trigger threshold number: for each of the received post-trigger number of consecutive power-up commands, incrementing the auxiliary power level by a non-zero incremental amount and transmitting the auxiliary pilot signal at the incremented auxiliary power level while concurrently holding the primary power level fixed and transmitting a primary pilot signal at the fixed current primary power level.

In yet another respect, various embodiments of the present invention provide, in an access terminal operating in a wireless communication system that includes a base station, wherein the access terminal and the wireless communication system both operate at least according to a IS-856, and the base station issues power-up and power-down commands according to inner-loop power-control protocols, an improvement comprising: means for receiving a trigger to begin transmitting an auxiliary pilot signal, wherein when the trigger is received an auxiliary power level is at zero and a primary power level is at a current primary power level; means for receiving from the base station a post-trigger number of consecutive power-up commands, wherein the post-trigger number is no greater than a post-trigger threshold number; and means for incrementing, responsive to reception of each of the post-trigger number of consecutive power-up commands, the auxiliary power level by a non-zero incremental amount, and for transmitting the auxiliary pilot signal at each incremented auxiliary power level while concurrently holding the primary power level fixed and transmitting the primary pilot signal at the fixed current primary power level.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 7 is a flowchart depicting an implementation of an example embodiment of triggered operation of a variable auxiliary pilot applied to switching the auxiliary pilot on.

DETAILED DESCRIPTION

The present invention will be described by way of example with reference to Code Division Multiple Access ("CDMA") communications in general, and to IS-856 and IS-2000 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. It should be understood that the present invention can apply to other wireless voice and data protocols including, without limitation, IS-95 and GSM, which, together with IS-856 and IS-2000 are considered herein, individually or in combination, to comprise a CDMA family of protocols.

Figure 1:
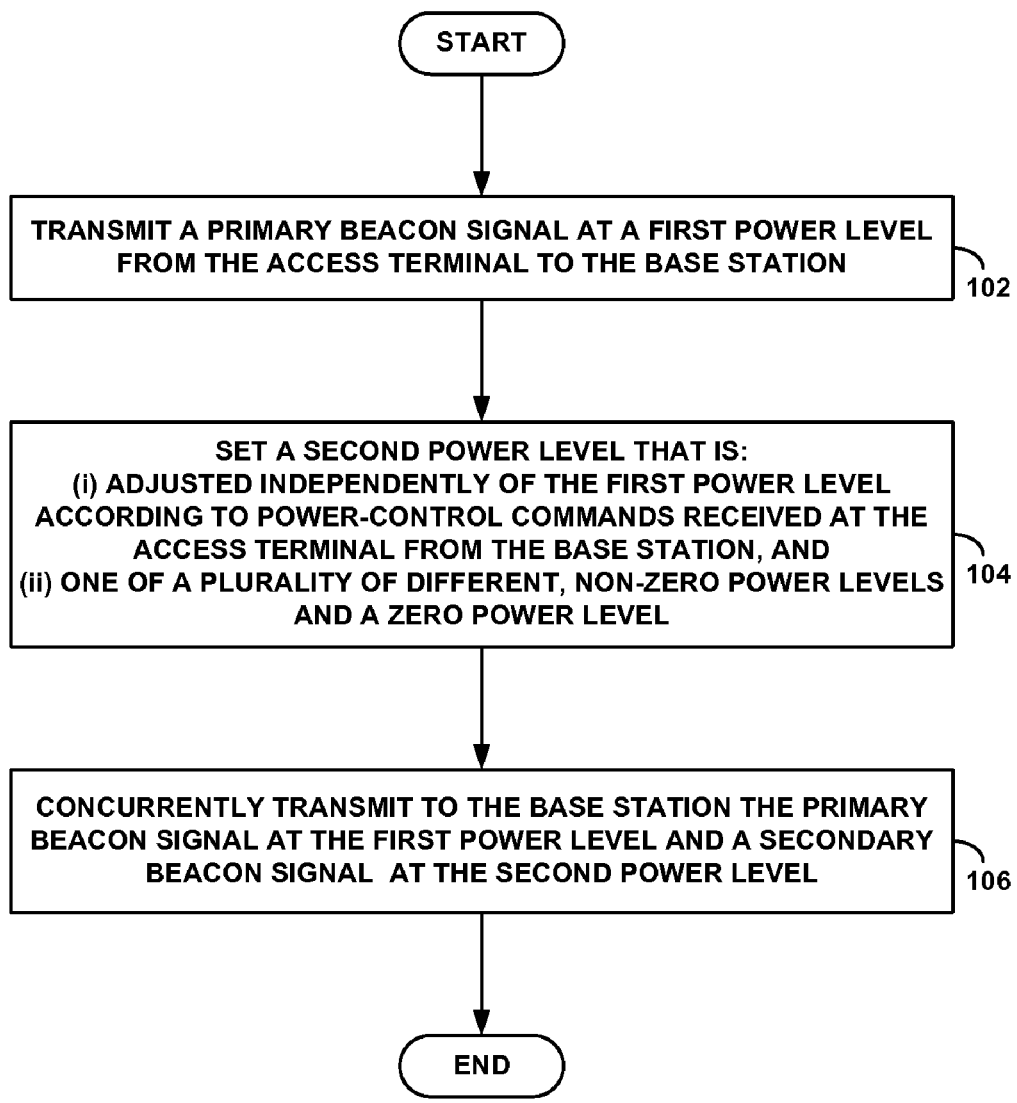
FIG. 1 is a flowchart illustrating an example embodiment of triggered operation of a variable auxiliary pilot.

FIG. 1 is a flowchart illustrating an example embodiment of a variable auxiliary pilot in an access terminal. By way of example, the steps of the flowchart could be implemented in an access terminal in a wireless communication system that operates according to a CDMA family of protocols. At step 102, a primary beacon signal is transmitted at a first power level from an access terminal to a base station. For an AT and base station operating according to IS-856, for instance, the primary beacon signal could be the primary pilot transmitted by the AT on its reverse link to the base station. The pilot signal of an AT is used by the AT's serving base station establish and maintain a timing reference for the AT, which then facilitates decoding by the base station of other signals sent to by the AT on its reverse link. The first power level would then be the transmission power of the AT's primary pilot signal. The power level could also be specified as a gain level, x, according to the relation $x\ dBm = 10\ log_{10}(P/1\ mW)$, where P is the power in mW (milliwatts).

At step 104, the AT sets a second power level by adjusting the second power level independently of the first power level according to power-control commands received at the AT from the base station. The value of the second power level is one of a plurality of different, non-zero power levels and a zero power level. In accordance with the present example embodiment, the secondary beacon signal could be an auxiliary pilot, and the second power level the transmission power of the auxiliary pilot. Further, the second power level could be specified in gain relative the primary pilot gain.

As described below, power-control commands could be power-up or power-down commands sent from the base station according to inner loop power-control protocols of IS-856, for instance. Upon receiving a certain sequence of power-up commands described below, the AT may hold the primary power level of the primary pilot fixed, while independently incrementing the auxiliary pilot in response to the power-up commands. Upon receiving a different sequence of power-down commands, the AT may initially decrement both the primary and auxiliary pilots, with the auxiliary pilot gain fixed with respect to the primary pilot gain, and then set the auxiliary pilot power to zero, independently of further reducing the primary pilot power.

Finally, at step 106, the AT concurrently transmits to the base station the primary beacon signal at the first power level and the secondary beacon signal at the second power level. In keeping with the present example embodiment, the primary beacon signal can be the AT's primary pilot and the secondary beacon signal can be the AT's auxiliary pilot. In practice, concurrent transmission of the primary and auxiliary pilots will be made by the AT for each increment or decrement of primary and auxiliary power that the AT sets in response to each received power-control command.

The auxiliary pilot is transmitted in order to effectively boost the power of the primary pilot as received by the base station. In so doing, the reliability of base station's timing reference for the AT is enhanced, thereby enhancing the reliability of decoding of the AT's reverse-link signals. Adjusting the auxiliary pilot power independently of the primary pilot power provides for a variable auxiliary pilot, and allows the primary and auxiliary pilots to be adjusted in more direct response to the RF conditions of the access terminal.

It will be appreciated that the steps of FIG. 1 are exemplary, and that additional and/or alternative steps or alternative ordering of steps could be carried out and still remain within the scope and spirit of the present invention.

Figure 2:
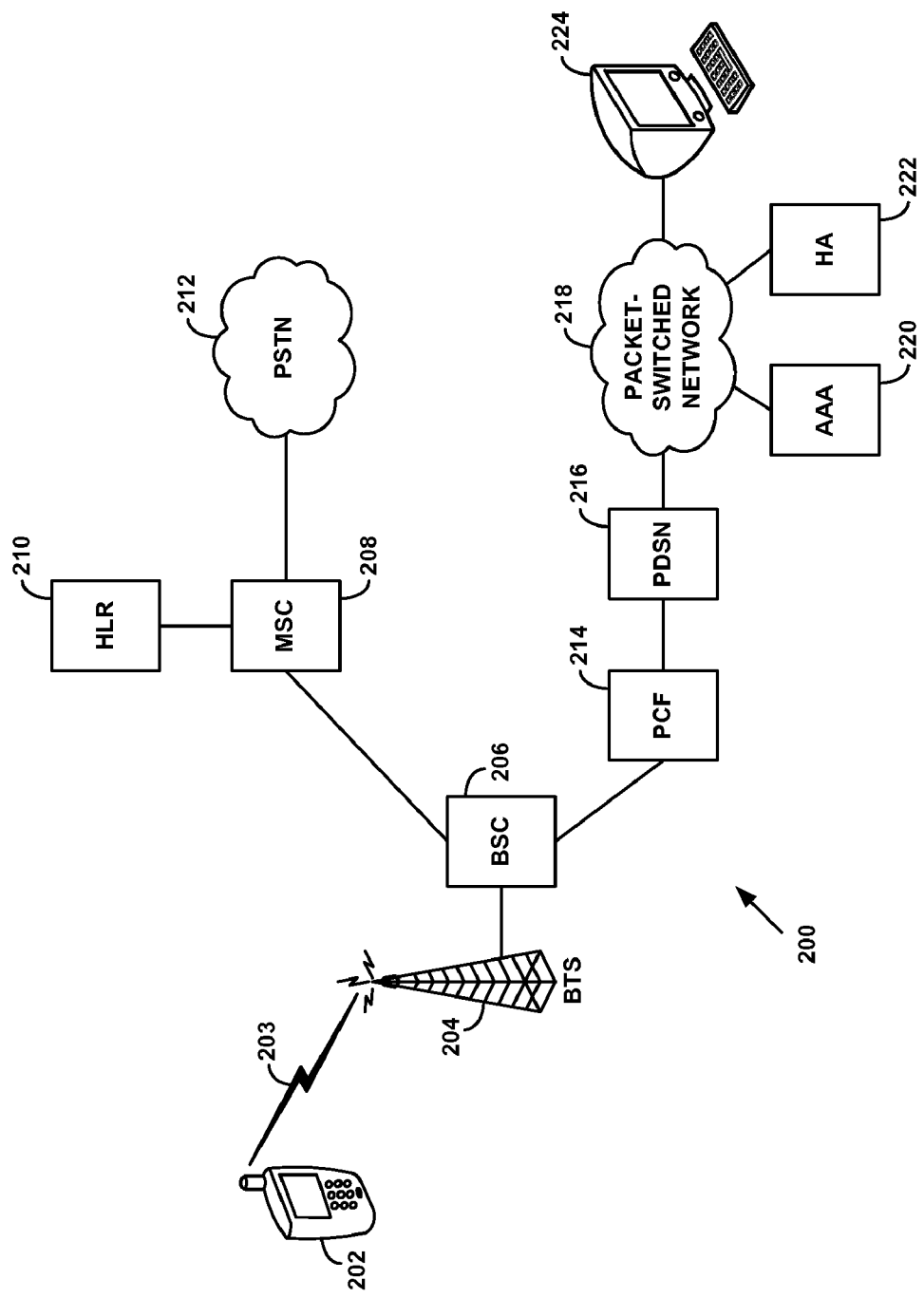
FIG. 2 is a simplified block diagram of a wireless communication system in which an example embodiment of triggered operation of a variable auxiliary pilot can be employed.

FIG. 2 shows a simplified block diagram of a wireless communication system 200 in which an example embodiment of triggered operation of a variable auxiliary pilot can be employed. Access terminal AT 202 communicates over an air interface 203 with a BTS 204, which is then coupled or integrated with a BSC 206. Transmissions over air interface 203 from BTS 204 to AT 202 represent the forward link to the access terminal (also referred to herein alternatively as the forward link from the base station, and as "the AT's forward link"). Transmissions over interface 203 from AT 202 to BTS 204 represent the "reverse link" (also referred to herein as "the AT's reverse link"). It will be appreciated that the arrangement shown in the figure is illustrative.

BSC 206 is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs or other telephony circuit switches in the operator's (or in a different operator's) network, thereby supporting user mobility across MSC regions, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a transceiver, a communication interface, a tone detector, a processing unit, and data storage, all of which may be coupled together by a system bus or other mechanism.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Data sent on both the forward and reverse links are first assembled into units called frames, which are then encoded for transmission to or from the access terminal at regular intervals (corresponding to a frame rate), typically 20 milliseconds in duration (although other frame intervals can be used). As a result of imperfect transmission, some frames received by the AT on the forward link or by the base station on the reverse link may contain errors. Other frames—ideally, the majority of them—will be received without errors. It may also be possible through one or another coding technique to correct certain errors in frames.

On either link, the receiving entity (e.g., AT or base station) can compute a ratio of (i) the number of error-containing frames received during a given period of time to (ii) the total number of frames received during the same period of time. This ratio, computed by the AT on the forward link and by the base station on the reverse link, is called the frame error rate (FER). The FER is an indicator of the RF conditions of the forward and/or reverse link, and consequently the quality service provided over the respective link. For instance, frame errors may manifest as lost audio samples, which in turn cause choppy or distorted audio output when played out by a receiving device. Similarly, frame errors may represent packet-data loss that results in retransmissions and lower overall throughput. In general, the higher the FER, the lower the quality of service will be, and vice versa. For a given set of physical conditions underlying communications between a base station and an access terminal, the higher the transmission power on the link (forward or reverse), the lower the FER will be. Consequently, the quality of service provided on a link can be adjusted and/or controlled by adjusting the transmission power used on the link.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In practice, similar methods of power control are implemented on both the forward and reverse links. For each link, two interrelated schemes are employed. The first, called "inner-loop" power control, achieves rapid convergence of link power to a level corresponding to a threshold signal-to-noise ratio (SNR). The second, called "outer-loop" power control, operates on a much longer time scale (i.e., more slowly) than the inner loop, and adjusts the inner-loop threshold SNR in response to the computed FER. Thus the outer loop adjusts the SNR threshold to attain a desired quality of service (as measured by FER), while the inner loop adjusts the link power to quickly achieve (at least approximately) the SNR threshold set by the outer loop. In accordance with the discussion above, further details of power control will be described with reference only the reverse link. However, it should be understood that, except for switching operational roles of an access terminal and a base station (i.e., roles with respect to sending and responding to power-control commands described below), the basic principles apply to the forward link as well.

More specifically, for inner-loop power control, the base station measures (for each reverse link) SNR at a rate of 800 times per second (although other rates are possible), each SNR measurement being made in terms of $E_b/N_0$, where $E_b$ is the energy per bit of the signal received by the AT and the $N_0$ is the noise power spectral density. For each measurement, the base station compares $E_b/N_0$ with a threshold value called $(E_b/N_0)_{setpoint}$ and responsively sets and sends a power control bit to the AT in order to affect a power adjustment. In practice, power adjustment is applied in terms of gain relative to a current power level, and measured in dB. For $E_b/N_0$ < $(E_b/N_0)_{setpoint}$, the base station sets the power control bit to "power up," and the AT responsively increases the reverse link gain by a small amount (typically 1 dB or less). For setpoint, the base station sets the power control bit to "power down," and the AT responsively decreases the reverse link gain by the same small amount. In this manner, the reverse link power rapidly converges, in small increments or decrements, to a level where $E_b/N_0 \approx (E_b/N_0)_{setpoint}$, and thereafter hovers about $(E_b/N_0)_{setpoint}$ until $(E_b/N_0)_{setpoint}$ is adjusted to a new value by outer-loop power control. Each transmission by the base station of the power control bit set to power up is commonly referred to as a "power-up command." Similarly, each transmission of the power control bit set to power down is referred to as a "power-down command."

For outer-loop power control on the reverse link, the base station computes the FER in consecutive windows, each being an integer number of frames in duration. Thus, in each window, FER may be expressed as the number of frames with errors divided by the number of frames per window. Typically, the duration of a window is 20 frames, although other window sizes (number of frames per window) could be used. For each window, the base station compares the computed FER with a reverse-link Target FER (TFER). If the computed FER is less than TFER, the base station decreases $(E_b/N_0)_{setpoint}$. Conversely, if the computed FER is greater than TFER, the base station increases $(E_b/N_0)_{setpoint}$. In this manner, a computed FER that exceeds the target FER drives the inner-loop power control to increase the reverse-link power, while a computed FER that is below the target FER drives the inner-loop power control to decrease the reverse-link power.

In the context of a CDMA family of protocols, the power control methods described in the preceding are sometime referred to as "inner-loop power-control protocols" and "outer-loop power-control protocols." It should also be noted that additional or alternative methods of power control may be applied to either of the forward or reverse links.

With arrangement described above, an access terminal can engage in cellular voice or packet-data communications. Referring again to FIG. 2, and taking an originating call from AT 202 as an example, AT 202 first sends an origination request over air interface 203 and via the BTS 204 and BSC 206 to MSC 208. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, the BTS of a serving sector transmits to all its active ATs on a common forward link, using time division multiplexing (TDM) to distinguish transmissions among the recipient ATs. Each transmission is made at the full power of the sector, thereby optimizing the achievable signal-to-noise characteristics. As a result of the full-power allocation by the sector, an access terminal operating under IS-856 can, in theory, receive packet-data at a rate of at least 38.4 kbps and up to 2.4 Mbps on its forward link. The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

Operationally, the IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. The pilot and MAC channels are together allocated 224 chips twice per time slot (a total of 448 chips) at pre-assigned positions within each time slot (i.e., at pre-assigned phases of each slot). The remaining chips are allocated for forward traffic ("data chips") or control. As in IS-2000, each sector in IS-856 is defined by a PN offset, and the pilot channel carries an indication of the sector's PN offset.

The IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include a pilot that serves as beacon signal for identifying the AT to the RAN and for establishing and maintaining a timing reference for decoding other signals received at the RAN from the AT.

In operation, each AT with an active data session in a given sector encodes reverse-link traffic-channel data using the same PN long code but with an AT-specific long-code mask. Each AT also transmits its pilot signal, which consists of all zeros encoded with a PN short code of zero and further encoded using an AT-specific long-code mask. ATs having active sessions with a given serving base station (or in a given sector) can transmit concurrently, so the serving base station receives a signal that is generally the superposition of transmissions from multiple ATs. The serving base station knows the long-code mask of each served AT with an active data session, and uses the mask to sort out each AT's pilot signal in order establish and maintain that AT's timing reference. A base station's timing reference for a given AT is essentially a synchronization with the AT's chips. Once the base station establishes synchronization, it can apply the AT's long-code mask to sort out data received from that AT and decode the data on a chip-by-chip basis. The pilot is transmitted nearly continuously during every 2,048-chip timeslot, allowing the base station to continuously update its timing reference for the AT as the AT moves about in the sector, or as other factors cause the AT's operational RF conditions to change.

Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000. In particular, for each active AT in a sector, the serving base station uses a calculated frame error rate to set an outer-loop SNR threshold (i.e., the $(E_b/N_0)_{setpoint}$), and, in accordance with inner-loop power control protocols, issues appropriate power-control commands—power-up or power-down commands—to cause the $E_b/N_0$ of the signal received from the AT to converge to the threshold. As described in detail below, an auxiliary pilot signal added to Rev. A of IS-856 can be advantageously adjusted in response to power-control commands from a base station in order to efficiently adapt to the access terminal's current RF conditions.

Operation in an IS-856 compliant communication system may be illustrated, again with reference to FIG. 2. To acquire packet data connectivity under IS-856, after an access terminal first detects an IS-856 carrier, the access terminal sends to its BSC (or RNC) 206 a UATI (Universal Access Terminal Identifier) request, and receives in response an UATI, which the access terminal can then use to identify itself in subsequent communications with the BSC. The access terminal then sends a connection-request to the BSC 206, and the BSC responsively invokes a process to authenticate the access terminal and to have the access terminal acquire a data link.

In particular, the BSC 206 sends an access request to an Access Network AAA (ANAAA) server (which may be different than the AAA server 220), and the ANAAA server authenticates the access terminal. The BSC 206 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. AUXILIARY PILOT TRIGGER a. Operating Principles

As described above, under IS-856 the reverse link consists of an access channel and a traffic channel. The traffic channel is further subdivided into a pilot channel, a MAC channel, and ACK channel and a data channel. The MAC channel further includes a reverse rate indicator (RRI) channel and a DRC channel. The transmission power applied to each of these channels is tied (or linked) to that of the pilot channel. In responding to inner-loop power-control commands from a serving base station, an access terminal adjusts the power of its pilot signal (i.e., the gain applied to its pilot channel). At the same time, the power applied to each of the other channels is scaled in relation to the pilot signal, such that the relative gain of each channel with respect to that of the pilot channel is kept fixed. For example, in typical operation, the reverse ACK channel is transmitted at 3 dB higher than the pilot channel (twice the pilot signal power), the RRI channel is transmitted at the same gain as the pilot channel (same power as the pilot signal), and the data channel is transmitted 3 dB lower (½ the pilot signal power). Note that using a fixed gain factor with respect to the gain of the pilot channel is equivalent to using a fixed power ratio with respect to the power of the pilot channel.

The data rate achievable on the reverse link depends on a combination of factors, including noise characteristics of the reverse link as reported to the AT by the base station, the amount of data to be sent by the AT, and the amount of reverse-link power the AT has to spare ("head room"). In turn, the data rate will be used to determine the size of the payload of link-layer packets sent from the AT to the base station. A higher achievable data rate supports higher-density coding, and hence more data symbols per frame and a correspondingly larger payload size. Conversely, a smaller data rate accommodates lower-density coding and thus a smaller payload size.

The ability of the base station to correctly decode a packet received from a given AT depends on the quality and reliability of the base station's timing reference for the AT, which, in turn, depends (at least in part) on the strength of the AT's pilot signal. In particular, as payload size grows with the data rate of an AT's reverse-link data channel, the importance of a reliable timing reference for that AT at the serving base station correspondingly increases. To help ensure the requisite reliability, Rev. A of the IS-856 standard introduced an "auxiliary pilot" signal that an AT turns on and off according to the payload size that the AT transmits on its reverse-link data channel. Specifically, in conventional operation under IS-856, Rev. A, a system-wide threshold of payload size is set according to a parameter called "AuxiliaryPilotChannelMinPayload" such that an access terminal will turn on its auxiliary pilot whenever the AT starts transmitting link-layer packets with payloads at least as large as the threshold. The AT will subsequently turn off its auxiliary pilot if the payload size drops below the threshold. With the introduction of the auxiliary pilot, the nominal pilot is redesignated as the "primary pilot" signal (or channel).

When switched on, an AT's auxiliary pilot is conventionally transmitted at a fixed gain below that of the primary pilot, typically at −9 dB with respect to the gain of the primary pilot (although other values could be used). This difference between the gain of the primary and auxiliary pilot signals shall be referred to herein as the "pilot gain differential" or just the "gain differential." Note that the auxiliary pilot gain trails the primary pilot gain by the gain differential, so the larger the gain differential, the lower the auxiliary gain with respect to the primary gain, and hence the lower the auxiliary pilot power. Except for the reduced power level with respect to the primary (i.e., the gain differential), however, the auxiliary pilot is identical the primary, being encoded with the same PN long-code mask. Thus, the primary and auxiliary pilots are effectively additive to a single pilot signal that is identical to either one of them but having their combined transmission power. From the perspective of the serving the base station, the AT appears to be transmitting a stronger pilot signal. In turn, the base station's timing reference for the AT is made more reliable.

During the time that an AT's auxiliary pilot is switched on in accordance with conventional operation (i.e., during the time that the AT's link-layer payloads remain at least as large as the threshold set by AuxiliaryPilotChannelMinPayload), the auxiliary pilot gain is fixed at the gain differential with respect to the gain of the primary pilot. Thus, the auxiliary pilot signal strength increases and decreases as a function of the primary pilot signal strength, as the primary pilot gain increases and decreases in response to power-up and power-down commands received from the serving base station. In this mode of operation, as with the other reverse channels described above, the auxiliary pilot power can be considered to be tied or linked to the primary pilot power.

b. Power-Control Triggering and Variable Gain Differential

While use of a threshold packet size to determine whether or not an AT should switch its auxiliary pilot on or off can help ensure reliable decoding of data by the base station, the relative benefits of the auxiliary pilot also depend on proper setting of the threshold. For example, if AuxiliaryPilotChannelMinPayload is set too high, then an AT may transmit many packets with payloads too large to be reliably decoded by the serving base station in the absence of the AT's auxiliary pilot and its enhancement to the base station's timing reference for the AT. In this case, packet error rates may increase. Conversely, if AuxiliaryPilotChannelMinPayload is set too low, then an AT may switch on its auxiliary pilot for transmissions of many packets with payloads that can be decoded by the base station even in the absence of the auxiliary pilot signal. In this case, the AT will needlessly consume additional battery power by transmitting the auxiliary pilot at times when it is not needed. Unneeded transmission of the AT's auxiliary pilot will also contribute unnecessarily to general noise and interference on the reverse link in the serving sector. Thus, appropriate setting of the system-wide threshold for packet size involves evaluation of tradeoffs exemplified above, among other possible factors.

Similarly, there are tradeoffs in setting the gain differential. If set too large (i.e., the auxiliary pilot gain too far below the primary pilot gain), the added power of the auxiliary pilot signals may frequently be insufficient to significantly enhance the reliability of the base station's timing references for active ATs. In this case the general effectiveness of the auxiliary pilot may be correspondingly reduced. Conversely, if the gain differential is set too small, the effectiveness of the auxiliary pilot may be correspondingly increased, but at a higher average cost to AT battery power and to increased reverse-link noise and interference, particularly if a larger gain differential would have sufficed to achieve the same level of effectiveness.

The challenges of appropriately setting either or both of the threshold and the gain differential arise, at least in part, because the factors that go into balancing the tradeoffs that need to be considered are dynamic. In particular, relying solely on packet size to control use of the auxiliary pilot does not take account of the immediate RF conditions under which the AT is operating. By contrast, the inner-loop power-control protocols described above are designed for rapid response to the dynamic quality of an AT's reverse link, and hence the continuous sequence of power commands from the serving base station provides a good indicator of the immediate RF conditions on an AT's reverse link. Accordingly, embodiments of the present invention use the inner-loop power control commands received at an AT from its serving base station to both trigger operation of the AT's auxiliary pilot signal, and adjust a variable gain differential.

In accordance with an example embodiment, an access terminal may use reception of a first threshold number of consecutive power-up commands to trigger activation of its auxiliary pilot, and then use reception of up to a second threshold of consecutive power-up commands to incrementally increase the transmission power of its auxiliary pilot independently of the power level of its primary pilot. More specifically, when the transmission power of an AT's auxiliary pilot signal is at zero Watts (or other suitable power unit), the AT will not be transmitting its auxiliary pilot signal. Upon receiving a first number of consecutive power-up commands from its serving base station, the AT will increase the gain of its primary pilot for each received power-up command in accordance with conventional operation, while continuing to hold the power level it auxiliary pilot at zero. If the first number is equal to the first threshold number, then the AT will be triggered to activate its auxiliary pilot starting at a maximum setting of gain differential (i.e., at a minimum power level of the auxiliary pilot) upon the next received power-control command.

In particular, if immediately following auxiliary pilot activation, up to and including a second threshold number of consecutive power-up commands are received, then for each such received power-up command the power level of the auxiliary pilot will be incremented by a non-zero incremental amount and the auxiliary pilot transmitted at each incremented power level. At the same time, the primary pilot will be transmitted while being held fixed at its most recent power level (gain) following trigger-activation of the auxiliary pilot; i.e., at the power level that resulted from the last of the first threshold number of received power-up commands. Thus, with the power level of the primary pilot fixed, and only the power level of the auxiliary pilot incremented for each of the second number of consecutive power-up commands, the auxiliary pilot power level will be advantageously adjusted independently of the primary pilot power level. In other words, the auxiliary pilot power is effectively "de-linked" from the primary pilot power, thereby allowing an optimum gain differential to be determined. Note that each non-zero increment of the auxiliary pilot power corresponds to an increment in auxiliary pilot gain and a corresponding decrement in gain differential.

If thereafter, a subsequent power-up command is received at the AT, and the AT determines that the second number is less than the second threshold number, the AT will again increment the power of the auxiliary pilot while still holding the power of the primary pilot fixed. The AT will then also increment the value of the second number by one, since the received power-up command will have extended by one the number of consecutive power-up commands received since the trigger-activation of the auxiliary pilot signal. The same actions will be taken by the AT for any additional, subsequent consecutive power-up command as long as the updated second number is still less than the second threshold number when the additional consecutive command is received.

If a power-down command is received at the AT subsequent to trigger-activation of the auxiliary pilot, then the AT will responsively adjust the power level of the primary pilot downward, and will revert to adjusting the auxiliary pilot power as a function of the primary pilot power; namely at a fixed gain differential below the adjusted primary pilot gain. That is, the auxiliary pilot power will again be linked to the primary pilot power. The fixed gain differential applied in this case will be the most recent value set in accordance with the number of consecutive power-up commands received following trigger-activation of the auxiliary pilot. If the first power-control command received at the AT following trigger-activation of the auxiliary pilot is a power-down command, then the maximum gain differential will be applied.

If the second number of consecutive power-up commands equals the second threshold number, then upon receipt at the AT of subsequent power-control commands (power-up or power-down), the AT will again adjust the primary pilot gain accordingly and revert to adjusting the auxiliary pilot gain in linked fashion at a fixed gain differential below the adjusted primary pilot gain. The fixed gain differential applied in this case will be the most recent value set in accordance with the second threshold number of consecutive power-up commands received following trigger-activation of the auxiliary pilot.

In incrementing the auxiliary pilot gain over the course of the second number of received, consecutive power-up commands, the gain differential decrements from a maximum to a minimum value. The smallest gain differential achieved in this manner corresponds to receiving the second threshold number of consecutive power-up commands; for any power-control commands received thereafter the gain differential is fixed at this smallest value, and the AT will again responsively adjust the primary pilot with the auxiliary pilot gain set below the primary by the (now) fixed gain differential.

Since the auxiliary pilot power is initially zero (prior to trigger activation), the sum of the second threshold number of power increments is the total power of the auxiliary pilot after all of the increments are applied. In further accordance with the example embodiment, the second threshold number and the size of each increment are determined so as to make this total power equal a particular predetermined fractional value of the fixed power of the primary pilot (fixed over the course of the increments). Since the second threshold number of power increments also corresponds to achieving the minimum gain differential, the particular predetermined fractional value may also be expressed in terms of the minimum gain differential. Thus the role of the second threshold number can also be viewed as setting a threshold gain differential or threshold power level after which conventional adjustment of the auxiliary pilot power relative to primary pilot power is used for subsequent power-control commands.

As an example, a minimum gain differential of 9 dB corresponds to an auxiliary pilot gain at −9 dB with respect to the primary pilot gain, or to a fractional value of roughly ⅛. Taking, for purposes of illustration, the second threshold number to be five and each gain increment (or gain differential decrement) following the initial one to be 1 dB, then the initial (maximum) gain differential would be 13 dB. That is, the first gain increment would turn on the auxiliary pilot at a gain of −13 dB with respect to the fixed gain of the primary pilot. Then the next four 1-dB increments would increase the auxiliary pilot gain to −12, −11, −10, and −9 dB with respect to the primary pilot gain. The corresponding power of the auxiliary pilot at each gain in absolute unit (e.g., Watts) is easily calculated from a known absolute gain of the primary pilot (e.g., in dBm) and the relation between dB and Watts. Other values of minimum gain differential and second threshold number could be used as well, as could other combinations of increment size with second threshold number.

In further accordance with the example embodiment, packet payload size may still be used to trigger activation of the auxiliary pilot of an AT, but with the same post-trigger behavior described above for power-up-triggered activation. Thus an AT would trigger activation of its auxiliary pilot upon the first occurrence of (1) receiving the first threshold number of consecutive power-up commands for the serving base station, or (2) determining that its payload size exceeded the payload size threshold. Once the auxiliary pilot is activated, the AT would hold the primary pilot power fixed at the current level; i.e., the level when trigger event (1) or (2) is received. The behavior described above for reception of subsequent power-control commands would then apply.

As described above, after an AT activates its auxiliary pilot and then subsequently receives of a power-down command or the second threshold number of consecutive power-up commands, it reverts to "linked mode" operation in which the auxiliary pilot power is linked to the primary pilot power. As yet a further aspect of the present embodiment, an AT currently operating in linked mode will advantageously set its auxiliary pilot power to zero and refrain from transmitting the auxiliary pilot upon the first occurrence of (a) receiving a third threshold number of consecutive power-down commands from the serving base station, or (b) determining that its payload size had dropped below the payload size threshold. Note that (b) only applies if the AT is already transmitting packets with payloads that meet or exceed the threshold.

For the purposes of the discussion herein, the first number and first threshold number shall also be referred to respectively as the "pre-trigger number" and the "pre-trigger threshold number." Similarly, the second number and second threshold number shall also be referred to respectively herein as the "post-trigger number" and the "post-trigger threshold number."

c. Example Operation

FIGS. 3-6 illustrate the aspects of the above example embodiment by way of example operation in various situations or "use cases," each use case corresponding to a particular sequence of power-control commands. Each figure includes three horizontal panels, labeled (from bottom to top) "(a)," "(b)," and "(c)." Panel (a) shows a timeline of power-control commands received by an AT; the upward arrows represent power-up commands and the down-ward arrows represent power-down commands. Each command has an associate numerical label for purposes of the discussion herein. As indicated, time increases toward the right side of the panel.

Panel (b) depicts the primary pilot gain set in response to each received power-control command shown in panel (a). The horizontal axis corresponds to the same timeline as the power-control timeline in panel (a), and the vertical axis represents the gain of the primary pilot in dB relative to an absolute gain setting of x dBm, where x is an arbitrary reference value (as indicated by the hatch lines near the bottom of the gain axis). As an example, x=−12 would be consistent with a typical operating range of an AT, corresponding to about 63 µW (micro Watts) of power (1 µW=$10^{-3}$ mW (milliwatts)). Each gain setting is represented by a rightward-pointing horizontal arrow. A "dot" at the left (tail) end of each arrow marks the time of the power-control command that resulted in the gain setting represented by the arrow.

Panel (c) depicts the auxiliary pilot gain set in response one or another trigger event, and/or one or another power-control command, and/or as a function of a corresponding adjustment of the primary pilot gain. The meaning and interpretation of the symbols in panel (c) is largely the same as that in panel (b). Note that the gain values on the vertical axis in panel (c) are shown in dB relative to the gain of the primary pilot, expressed with reference to x dBm.

For all of the examples illustrated in FIGS. 3-6, the first (pre-trigger), second (post-trigger), and third threshold numbers are each taken to be five. It will be appreciated that other values could be used for any one or all of these threshold numbers. Other features of FIGS. 3-6 are described as necessary in the following discussion.

Figure 3:
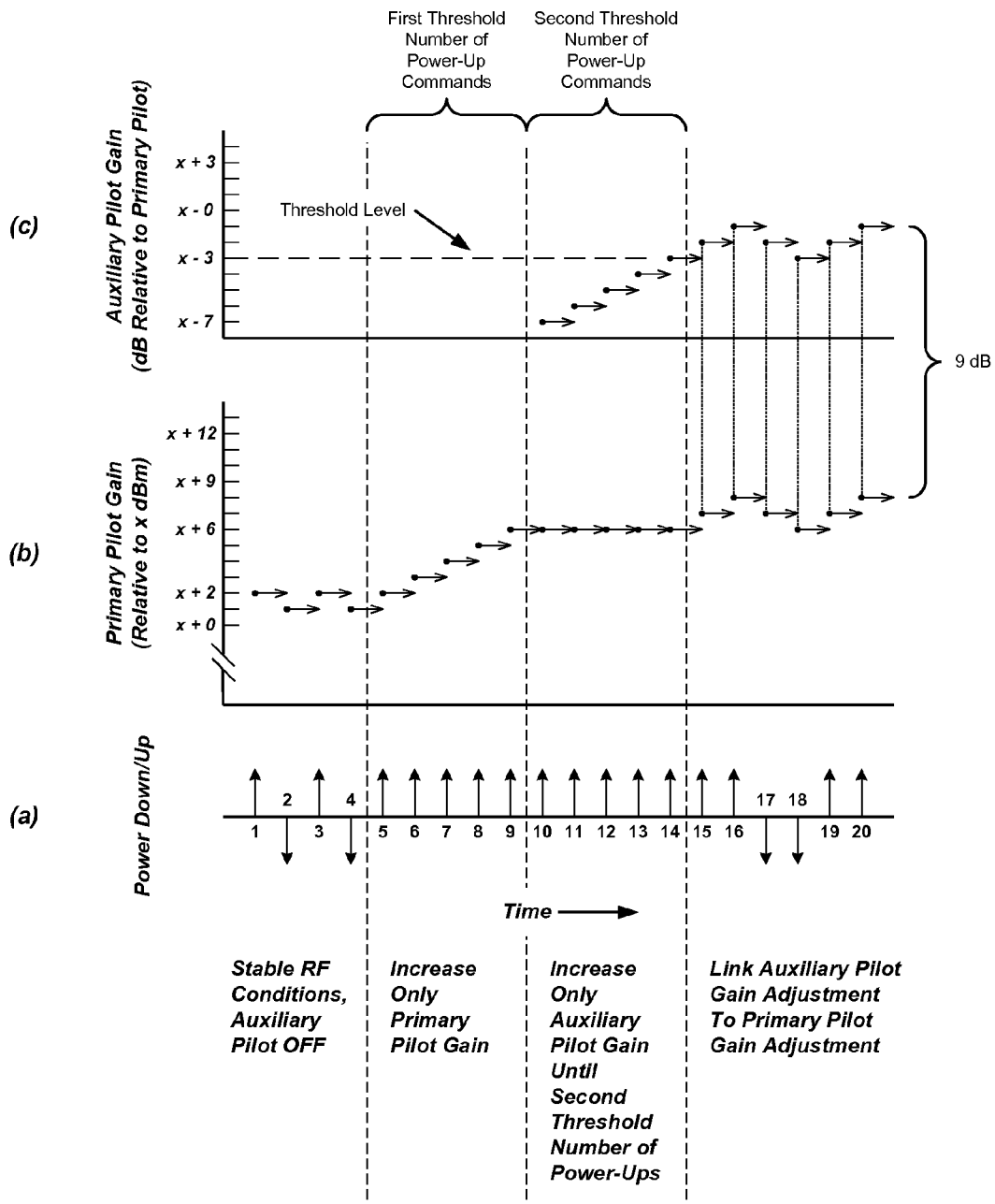
FIG. 3 illustrates an example of operation of triggering of a variable auxiliary pilot for a use case of a first example sequence of power-control commands.

FIG. 3 illustrates triggering of an AT's auxiliary pilot responsive to the AT receiving a first threshold number of consecutive power-up commands. In this example, the AT's auxiliary pilot is initially off, and the AT is evidently transmitting packets with payloads that are below the payload size threshold. Four conceptual time zones are depicted in this example. In the first time zone, power-control commands 1, 2, 3, and 4 alternate power-up and power-down (panel (a)), indicative of "stable" operation with regard to RF conditions, for instance. As indicated in panel (b), the AT adjusts the primary pilot gain to (x+2) dBm responsive to receiving power-up command #1, then decreases the gain by −1 dB to (x+1) dBm responsive to receiving power-down command #2, and so on through power-down command #4.

In the second time zone, the AT receives five consecutive power-up commands (5-9), and responsively increments the primary pilot gain from (x+1) dBm to (x+6) dBm (79 µW to 251 µW). The auxiliary pilot remains off in the second time zone. However, these five power-up commands correspond to the first threshold number, and upon responding to the fifth one, the AT triggers activation of its auxiliary pilot. Receipt by the AT of the fifth (or last of the first threshold number) of consecutive power-up command may be considered as receipt of the trigger.

In the third time zone, the AT receives five more consecutive power-up commands (10-14), and responsively increments the auxiliary pilot gain, first to (x−7) dBm (13 µW), then in four 1-dB increments to (x−3) dBm (32 µW). With the primary pilot held fixed at its last gain setting of (x+6) dBm (251 µW) for each of these increments, the gain differential is seen to decrease from 13 dB to 9 dB. The five consecutive power-up commands (10-14) correspond to the second threshold number, and thus (x−3) dBm in panel (c) corresponds to the threshold gain described above. A dashed horizontal line labeled "Threshold Level" in panel (c) marks this gain threshold, which is −9 dB with respect to the fixed pilot gain of (x+6) dBm. Thus, in this example, the minimum gain differential corresponds to setting the auxiliary pilot gain to particular fractional value of (approximately) ⅛ of the primary pilot gain.

In the fourth time zone, the AT receives power-control commands (15-20), which include power-up and power-down commands. Since the AT has received the second threshold number of power-up commands, the auxiliary gain is linked to the primary gain beginning with power-control command #15. As indicated, the minimum gain differential of 9 dB is used.

Figure 4:
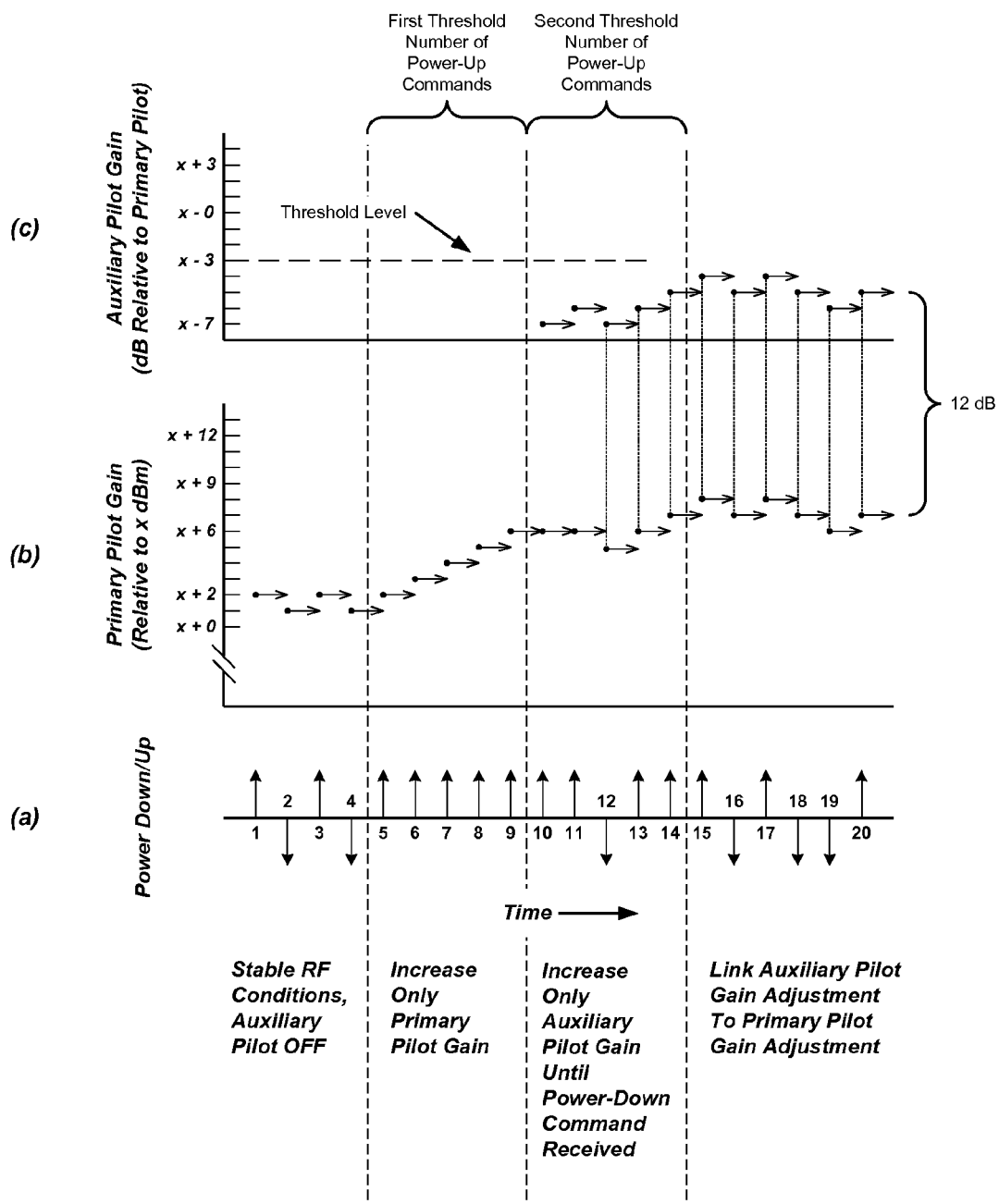
FIG. 4 illustrates an example of operation of triggering of a variable auxiliary pilot for a use case of a second example sequence of power-control commands.

FIG. 4 also illustrates triggering of an AT's auxiliary pilot responsive to the AT receiving a first threshold number of consecutive power-up commands. This example is similar to that illustrated in FIG. 3, except that not all of the second threshold number of consecutive power-up commands are received following trigger-activation of the auxiliary pilot. In the third time zone, after receiving only two consecutive power-up commands (10-11), the AT receives a power-down command (#12). As shown in FIG. 4 (and in accordance with the example embodiment described above), the AT begins linked operation of its pilot and auxiliary pilots beginning with power-control command #12. Since the first two consecutive power-up commands (10-11) received caused the AT to increment its auxiliary pilot gain to −12 dB with respect to the fixed pilot gain, the gain differential used in the linked operation is 12 dB, as indicated. The AT continues to operate in linked mode as it receives a mix of power-up and power-down commands following power-down command #12.

Figure 5:
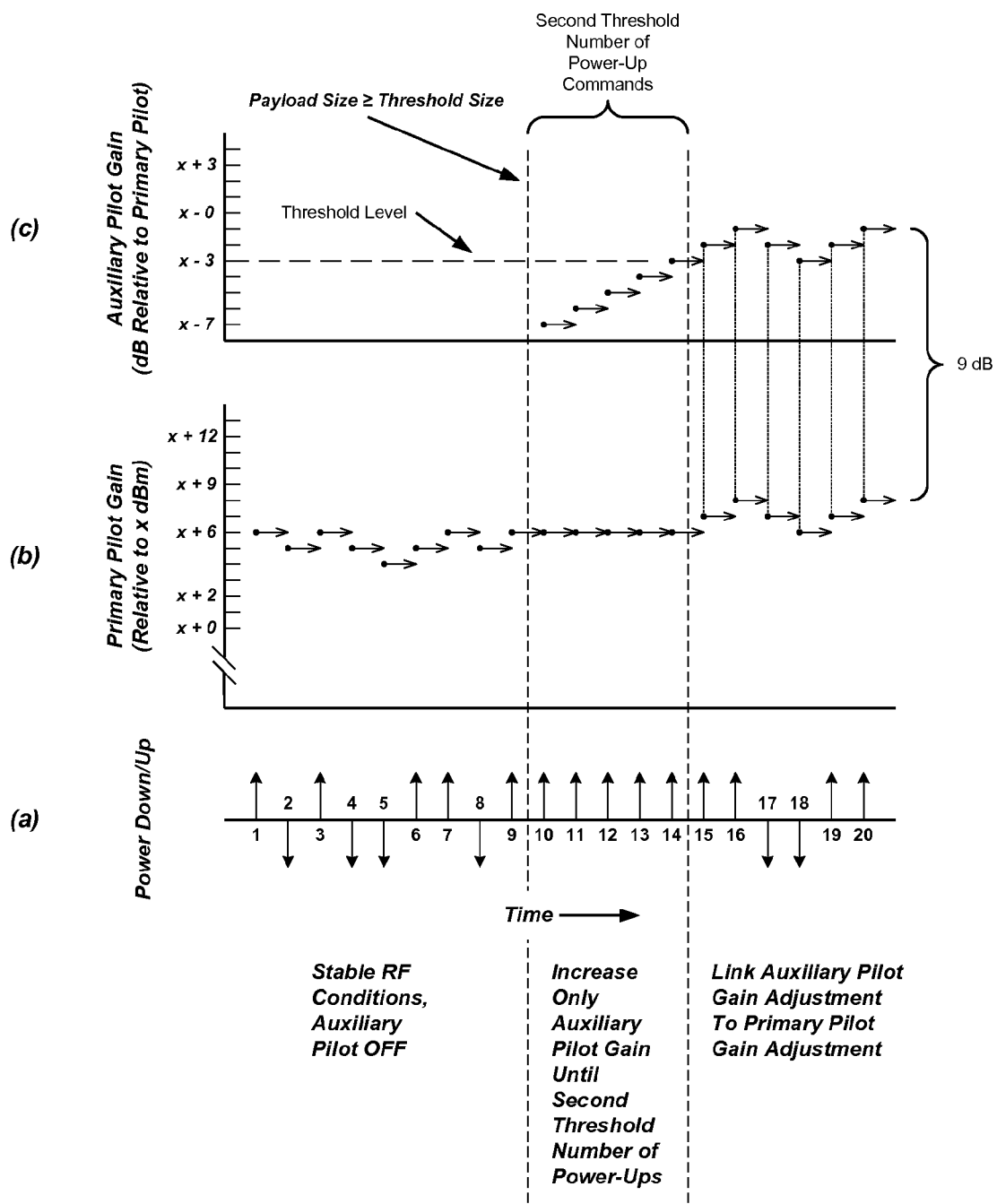
FIG. 5 illustrates an example of operation of triggering of a variable auxiliary pilot for a use case of a third example sequence of power-control commands.

FIG. 5 illustrates triggering of an AT's auxiliary pilot responsive to the AT determining that its transmitted packet payload size has reached or exceeded the threshold size. This example is again similar to that illustrated in FIG. 3, except that there is no conceptual second time zone. Instead, the stable RF conditions of the first time zone persist until the packet payload size is exceeded (or at least achieved) sometime between power-control commands #9 and #10. As shown in the figure, the pilot gain is at (x+6) dBm when this occurs. Beginning with power-up command #10, the sequence of power-control commands is the same as that illustrated in FIG. 3, and operation of the AT's primary and auxiliary pilots is identical to that shown in FIG. 3. Note that if the sequence of power-control commands from #10 onward was replaced by those shown illustrated in FIG. 4, then the operation shown for these power-control commands in FIG. 5 would then be the same as the corresponding power-control commands shown in FIG. 4.

Figure 6:
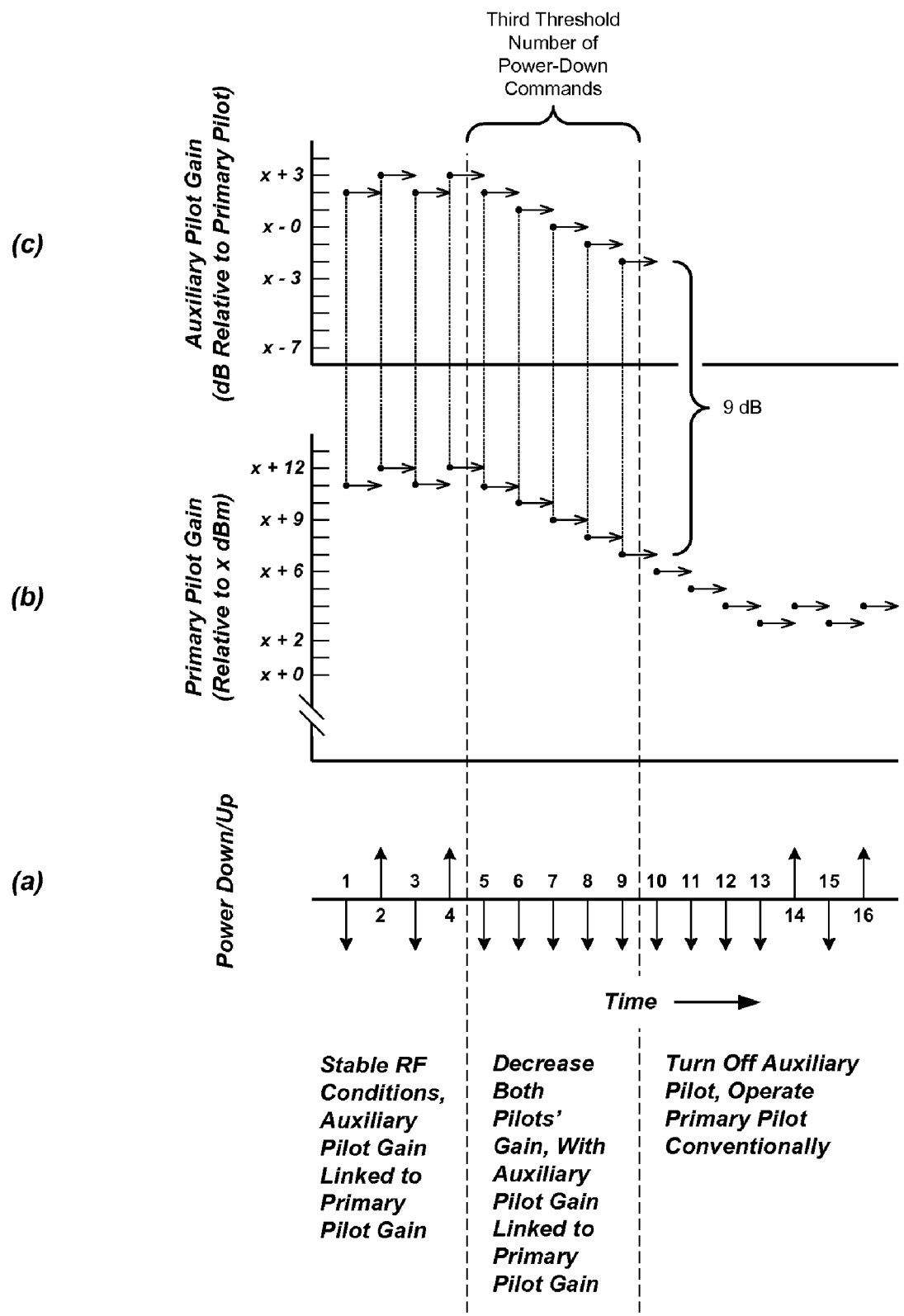
FIG. 6 illustrates an example of operation of triggering of a variable auxiliary pilot for a use case of a fourth example sequence of power-control commands.

Finally, FIG. 6 illustrates linked operation of the primary and auxiliary pilots when the third threshold number of consecutive power-down commands is received at the AT. Three conceptual time zones are shown in this figure. During the first (power-control commands 1-4), the AT is operating in linked mode under stable RF conditions. By way of example, the gain differential is 9 dB. In the second time zone, five consecutive power-down commands are received (5-9), which corresponds to the threshold number. Linked operation continues for each of these five power-down commands, but beginning in the third time zone (after the fifth consecutive power-down command is received), the AT sets the power level of its auxiliary pilot to zero, independently of decreasing its primary power level, and refrains from transmitting the auxiliary pilot. Thus from power-control command #10 onward, the AT operates only its primary pilot.

Although not illustrated in FIG. 6, if the packet payload size were initially at least as large as the threshold (i.e., as of power-control command #1), then the AT would turn off its auxiliary pilot in response to determining that the payload size dropped below the threshold size at any time prior to receiving the third threshold number of consecutive power-down commands. That is, the first occurrence of either condition will cause the AT to cease transmitting its auxiliary pilot signal.

4. IMPLEMENTATION OF EXAMPLE EMBODIMENT

The example embodiment described above can be implemented as a method carried out on an access terminal or other communication device that operates according to IS-856 in a similarly-compliant wireless communication system such as the one described above in connection with FIG. 2. The logical steps and operations of the method are described in the next subsection. Example means for carrying out the method are described in the subsequent subsection.

a. Example Method

Figure 7:
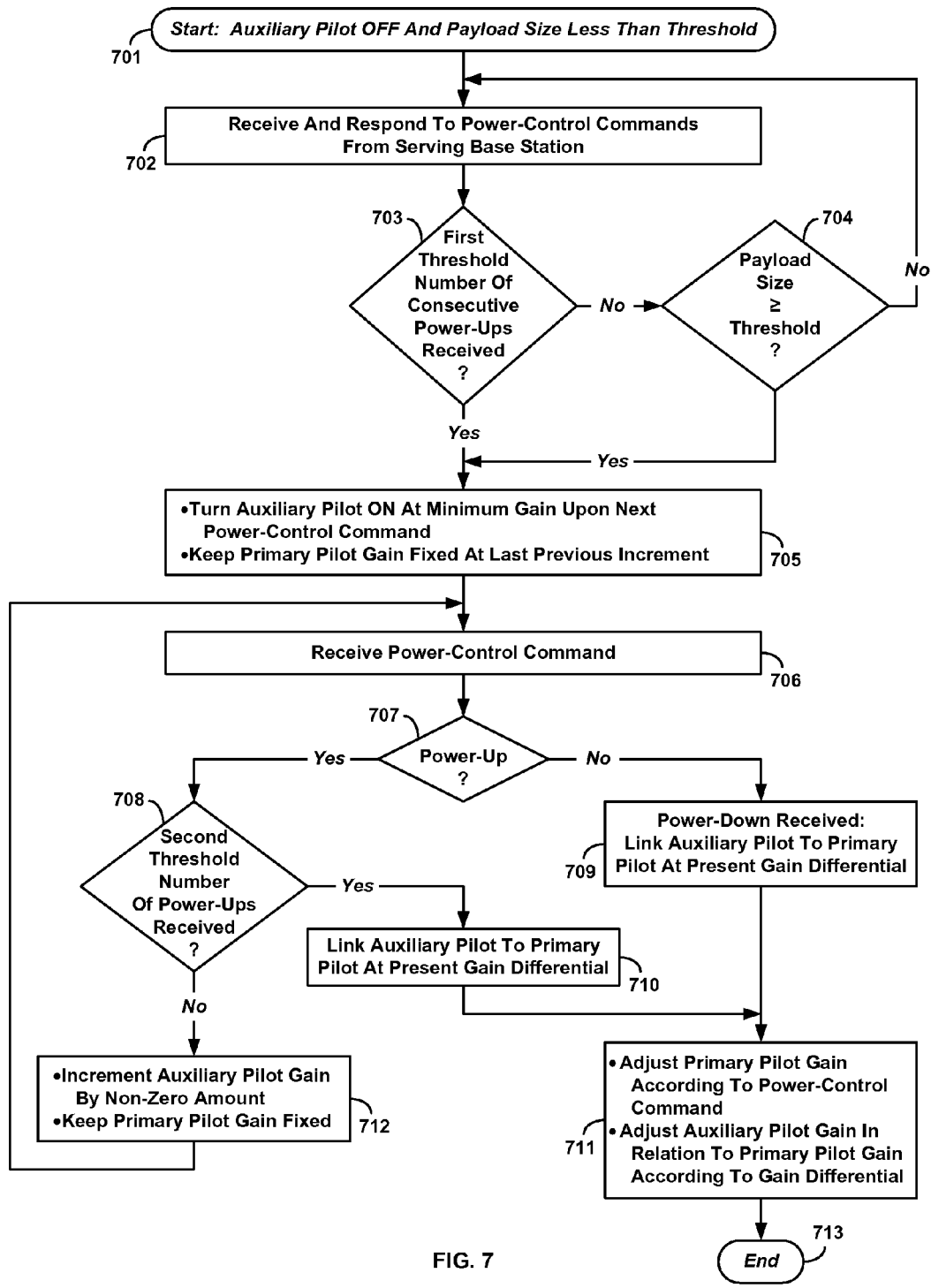
Figure 8:
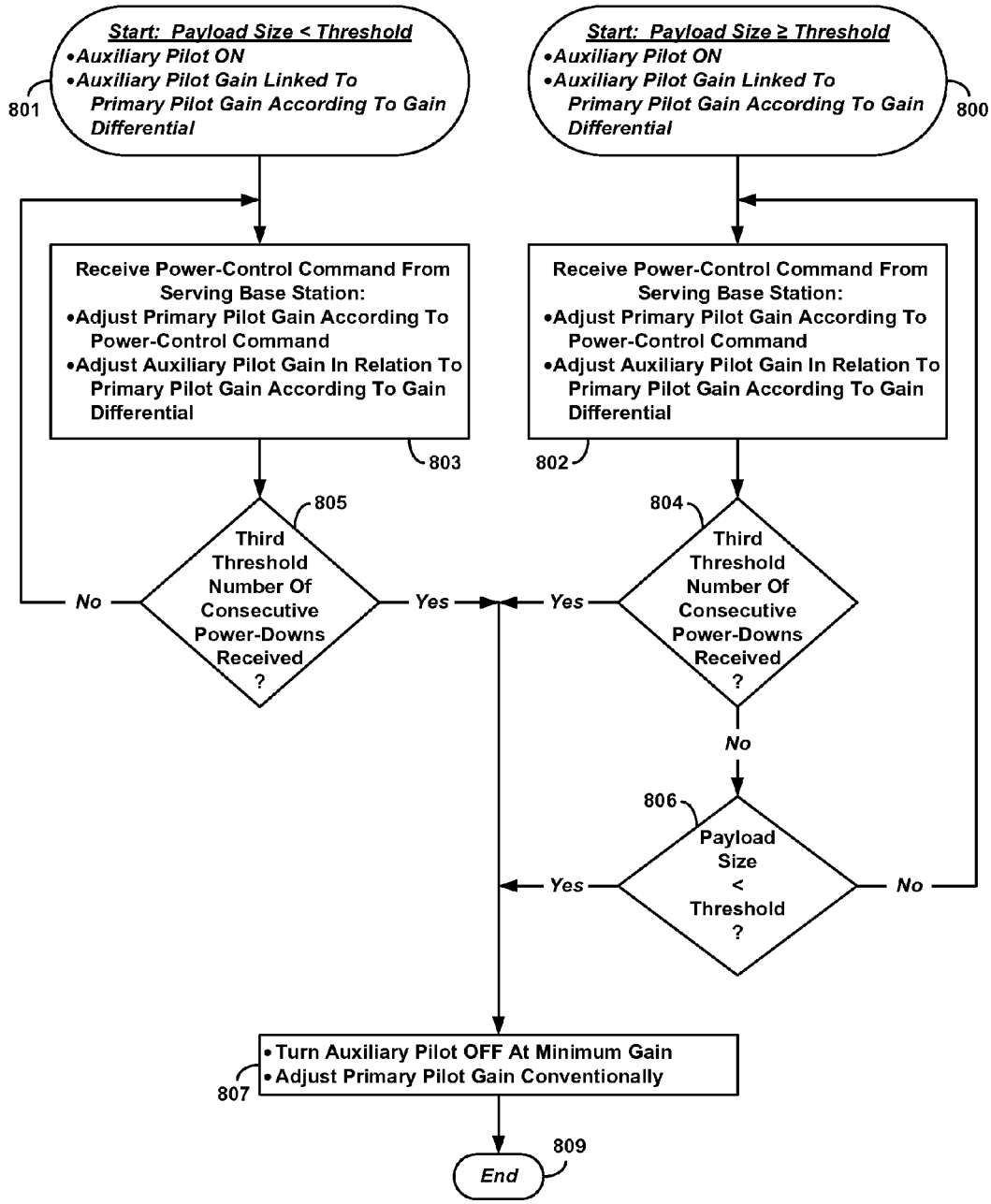
FIG. 8 is a flowchart depicting an implementation of an example embodiment of triggered operation of a variable auxiliary pilot applied to switching the auxiliary pilot off.

FIG. 7 depicts trigger-activation of an auxiliary pilot, and FIG. 8 depicts turning off an auxiliary pilot in response to power-down commands and/or payload size conditions. Both figures show the respective method aspects in the form of logical flowcharts.

At the start 701 of the trigger-activation method in FIG. 7, by way of example, the AT's auxiliary pilot is initially off and the payload size of the AT's reverse link packets is smaller than the threshold packet size (e.g., smaller than AuxiliaryPilotChannelMinPayload). At step 702, the AT receives and responds to a power-control command from its serving base station. Since the auxiliary pilot is off, the AT either increases or decreases it primary pilot gain by 1 dB (or other appropriate amount) depending on whether power-control command is a power-up or power-down command.

The AT next determines if the received power-control is the last of a first (pre-trigger) threshold number of consecutive power-up commands (step 703). For instance, the AT could keep in its memory a running tally of consecutive power-up commands, clearing the tally upon receiving a power-down command prior to reaching the first threshold number of consecutive power-up commands. If the determination at step 703 is negative, then the AT determines at step 704 if the payload size of its packets is at least as large as threshold packet size. If not, then the process returns to step 702, as indicated. The loop represented by steps 702-703-704-702 corresponds to operation under stable RF conditions and with packet size below the threshold, as illustrated in the first two time zones of FIGS. 3 and 4 or the first time zone of FIG. 5, for example.

If the determination of either of steps 703 or 704 is positive (first threshold number of consecutive power-up commands received or payload size at least as large as the threshold size), then activation of the auxiliary pilot is triggered in un-linked mode (step 705); i.e., the auxiliary gain is adjusted independently of the primary pilot gain. Specifically, the AT activates the auxiliary pilot so that upon receiving the next power-control command, the AT will transmit the auxiliary pilot at a minimum gain (maximum gain differential) with respect to the now fixed primary pilot gain.

As an alternative to beginning transmission of the auxiliary pilot upon the next received power-control command, the AT could begin auxiliary pilot transmission upon receiving the last of the first threshold number of power-up commands. Note, however, that this alternative is essentially equivalent to reducing the first threshold number by one.

At step 706, the AT receives the next power-control command, and at step 707 the AT determines if the received command is a power-up or power-down command. If the command is a power-up command, the AT then determines if a second (post-trigger) threshold number of power-up commands had already been received prior to receiving the current power-up command. As with the determination at step 703 of the count of consecutive pre-trigger power-up commands, the AT could use keep a similar tally to make the determination at step 708. If the determination is negative, then the AT increments the auxiliary pilot gain while holding the primary pilot gain fixed (step 712). The AT also concurrently transmits the primary and auxiliary pilots at their respective power levels (gains), and increments its tally of consecutively received power-up commands since step 705. Note that if the received power-control command at step 706 is the first one since step 705, then the gain increment will correspond to the maximum gain differential. Otherwise, the gain increment may be a small amount, such as 1 dB. The process returns to step 706 after step 712. The loop represented by steps 706-707-708-712-706 corresponds to operation in the third time zone of FIGS. 3 and 4 or the second time zone of FIG. 5, for example.

If the determination at step 708 is positive, then the AT will have received all of the second (post-trigger) threshold number of consecutive power-up commands from the serving base station prior to receiving the power-up command at step 706, in which case the AT will revert to linked-mode operation of the auxiliary pilot (step 710). Then at step 711, the AT adjusts its primary pilot gain up by a non-zero increment (e.g., 1 dB) and increments its auxiliary pilot gain as a function of the primary pilot gain, according to the now fixed gain differential. This step corresponds to the primary and auxiliary gain adjustments for power-up command #15 in FIG. 3, for instance. The process then ends at step 713.

If the power-control command received at step 706 is a power-down command (as determined at step 707), then the process proceeds to step 709, where again, the AT reverts to linked-mode operation of the auxiliary pilot. Note that the gain differential used is that of the most recent setting. If the power-control command received at step 706 (determined at step 707 to be a power-down command) is the first one since step 705, then the gain differential will be the initial, maximum value. Otherwise it will be some smaller value, since at least one power-up command will have been received. From step 709, the process proceeds to steps 711 and 713, which yield operation described above for these same steps.

Example operation for turning off the auxiliary pilot is shown in FIG. 8, where two parallel paths of operation are shown. Both begin with the AT initially operating in linked mode, with its auxiliary pilot on and the auxiliary gain set at a fixed gain offset below the primary pilot gain, but with different payload size conditions. For the path beginning at step 800, the payload size of the AT's packets is initially at least as large as the threshold size. At step 802, the AT receives a power-control command from the serving base station, and responsively adjusts the primary and auxiliary pilot gains (according to linked-mode operation).

At step 804, the AT determines if the received power-control command corresponds to having received a third threshold number of consecutive power-down commands. As with the pre- and post-trigger power-up commands, this determination could be made using a tally stored in some form of memory in the AT, for instance. If the determination is positive, then the AT turns off its auxiliary pilot and continues operating it primary pilot in a conventional manner (e.g., according to IS-856), as indicated at step 807. The process is then complete (step 809).

If the determination at step 804 is negative, the AT then determines if the payload size has dropped below the threshold (step 806). If it has (positive determination at step 806), then operation proceeds to steps 807 and 809, as described above. If the determination at step 806 is negative, the operation returns to step 802. The loop represented by steps 802-804-806-802 corresponds to operation in the first time zone of FIG. 6, for example.

For the parallel path of operation starting at step 801, the payload size of the AT's packets is initially smaller the threshold size. This path is otherwise nearly identical to that beginning at step 800, except that the AT does not make a payload-size determination. Thus, the progression 801-803-805-807 is the same as the progression 800-802-804-807, both of which complete with the AT turning off its auxiliary pilot. The loop represented by 803-805-803 is similar to the loop 802-804-806-802, except for the additional packet-size determination (step 806) for the first path, as noted.

It will be appreciated that the steps shown in FIGS. 7 and 8 meant to illustrate operation of an example embodiment. As such, various steps could be altered or modified, and the ordering of certain steps could be changed, while still achieving the overall desired operation.

b. Example Access Terminal

Figure 9:
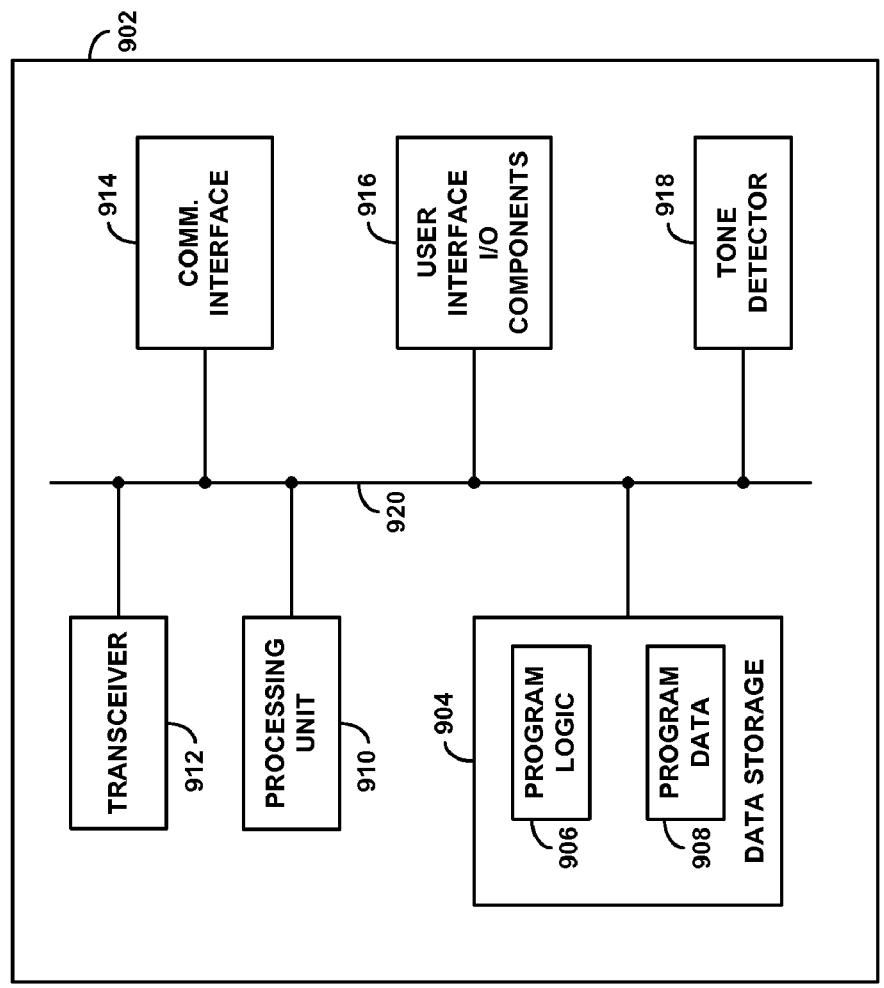
FIG. 9 is a block diagram of an example access terminal in which triggered operation of a variable auxiliary pilot may be implemented.

FIG. 9 is a simplified block diagram depicting functional components of an example access terminal 902 in which triggered operation of a variable auxiliary pilot may be implemented. The example AT 902 could be a cell phone, a personal digital assistant (PDA), a pager, a wired or wirelessly-equipped notebook computer, or any other sort of device. As shown in FIG. 9, the example AT 902 includes data storage 904, processing unit 910, transceiver 912, communication interface 914, user-interface I/O components 916, and tone detector 918, all of which may be coupled together by a system bus 920 or other mechanism.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of AT 902 relevant to triggering a variable auxiliary pilot are discussed briefly below.

Communication interface 914 in combination with transceiver 912, which may include one or more antennas, enables communication with the network, including reception of power-control commands from the serving base station and transmission of both the primary and auxiliary pilots, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 910 comprises one or more general-purpose processors (e.g., INTEL microprocessors) and/or one or more special-purpose processors (e.g., dedicated digital signal processor, application specific integrated circuit, etc.). In turn, the data storage 904 comprises one or more volatile and/or non-volatile storage components, such as magnetic or optical memory or disk storage. Data storage 904 can be integrated in whole or in part with processing unit 910, as cache memory or registers for instance. In example AT 902, as shown, data storage 904 is configured to hold both program logic 906 and program data 908.

Program logic 906 may comprise machine language instructions that define routines executable by processing unit 910 to carry out various functions described herein. In particular the program logic, communication interface, and transceiver may operate cooperatively to carry out logical operation such as that discussed above and illustrated in FIGS. 7 and 8. Further, program data 908 may be arranged to store one or more tallies of power-control commands maintained in conjunction with the logical operations described above.

It will be appreciated that there can be numerous specific implementations of triggered operation of a variable auxiliary pilot in an access terminal, such AT 902 illustrated in FIG. 9. Further, one of skill in the art would understand how to devise and build such an implementation. As such, AT 902 is representative of means for carrying out the method of triggering operation of a variable auxiliary pilot in accordance with the methods and steps described herein by way of example.

5. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal operating in a wireless communication system that includes a base station, a method comprising:

on an air interface communication link from the access terminal to the base station, transmitting a primary beacon signal at a first power level to the base station, wherein the primary beacon signal is used by the base station to maintain a common timing reference between the access terminal and the base station, the common timing reference facilitating decoding by the base station of other signals received from the access terminal;
setting a second power level: (i) by adjusting the second power level independently of the first power level according to power-control commands received at the access terminal from the base station, and (ii) to a value selected from a plurality of different, non-zero power levels, and a zero power level; and
on the air interface communication link from the access terminal to the base station, and concurrent with transmission of the primary beacon signal at the first power level, transmitting a secondary beacon signal to the base station at the second power level, wherein the secondary beacon signal is used by the base station to enhance reliability of the common timing reference.

2. The method of claim 1, wherein the access terminal and the wireless communication system both operate at least according to IS-856, and wherein the primary beacon signal is a primary pilot signal and the secondary beacon signal is an auxiliary pilot signal.

3. The method of claim 1, wherein the access terminal and the wireless communication system both operate according to a CDMA family of protocols, power-control commands comprise power-up and power-down commands sent by the base station according to inner-loop power-control protocols, and wherein setting the second power level comprises:
at the access terminal, receiving a trigger to begin transmitting the secondary beacon signal, the second power level being at zero and the first power level being at a current primary setting when the trigger is received; and
responsive to thereafter receiving each of a post-trigger number of consecutive power-up commands from the base station, wherein the post-trigger number is no greater than a post-trigger threshold number, incrementing the second power level by a non-zero incremental amount to an increased secondary setting while holding the first power level fixed at the current primary setting.

4. The method of claim 3, wherein receiving the trigger to begin transmitting the secondary beacon signal comprises:
at the access terminal, responsive to receiving from the base station each of a pre-trigger threshold number of consecutive power-up commands, ranging from a first to a last received power-up command:
incrementing the first power level to an increased primary setting while holding the second power level fixed at zero and refraining from transmitting the secondary beacon signal, wherein the current primary setting is the increased primary setting achieved after the last received power-up command.

5. The method of claim 3, wherein receiving the trigger to begin transmitting the secondary beacon signal comprises determining that a payload of a data packet to be transmitted by the access terminal to the base station is larger than a threshold payload size.

6. The method of claim 3, wherein transmitting the secondary beacon signal to the base station at the second power level comprises, for each incrementation of the second power level, transmitting the secondary beacon signal at the increased secondary setting of the second power level while concurrently transmitting the primary beacon signal at the fixed current primary setting of the first power level.

7. The method of claim 6, further comprising:
responsive to receiving an immediately-subsequent power-up command from the base station following the post-trigger number of consecutive power-up commands, and upon a determination that the post-trigger number is less than the post-trigger threshold number:
incrementing the second power level to a new increased secondary setting while holding the first power level fixed at the current primary setting, and transmitting the secondary beacon signal at the new increased secondary setting of the second power level while concurrently transmitting the primary beacon signal at the fixed current primary setting of the first power level.

8. The method of claim 6, further comprising:
responsive to receiving an immediately-subsequent power-down command from the base station following the post-trigger number of consecutive power-up commands, and upon a determination that the second number is less than the post-trigger threshold number:
decrementing the first power level to a decreased primary setting of the first power level and transmitting the primary beacon signal at the decreased primary setting of the first power level; and
decrementing the second power level to a decreased secondary setting of the second power level by computing a decrement as a function of the decreased primary setting and, concurrently with transmission of the primary beacon signal, transmitting the secondary beacon signal at the decreased secondary setting of the second power level.

9. The method of claim 8, further comprising:
responsive to receiving a subsequent power-control command from the base station following the power-down command:
adjusting the first power level in accordance with the power-control command to an updated primary setting and transmitting the primary beacon signal at the updated primary setting of the first power level; and
adjusting the second power level to an updated secondary setting of the second power level by computing an adjustment as a function of the updated primary setting and, concurrently with transmission of the primary beacon signal, transmitting the secondary beacon signal at the updated secondary setting of the second power level.

10. The method of claim 6, further comprising:
responsive to receiving a subsequent power-control command from the base station following the post-trigger number of consecutive power-up commands, and upon a determination that the second number is equal to the post-trigger threshold number:
adjusting the first power level in accordance with the power-control command to an updated primary setting and transmitting the primary beacon signal at the updated primary setting of the first power level; and
adjusting the second power level to an updated secondary setting of the second power level by computing an adjustment as a function of the updated primary setting and, concurrently with transmission of the primary beacon signal, transmitting the secondary beacon signal at the updated secondary setting of the second power level.

11. The method of claim 3, wherein the non-zero incremental amount is computed so as to make the sum of the post-trigger threshold number of incrementations at least as large as a particular predetermined fractional value of the first power level.

12. The method of claim 1, wherein the access terminal and the wireless communication system both operate according to a CDMA family of protocols, power-control commands comprise power-up and power-down commands sent by the base station according to inner-loop power-control protocols, and wherein setting the second power level comprises:

at the access terminal, responsive to receiving each of a first threshold number of consecutive power-down commands from the base station, decrementing the first power level to a decreased primary setting of the first power level, and decrementing the second power level to decreased secondary setting of the second power level by computing a decrement as a function of the decreased primary setting; and responsive to thereafter receiving an immediately-subsequent power-down command from the base station, decrementing the first power level to a new decreased primary setting of the first power level, and independently of the first power level, decrementing the second power level to zero.

13. The method of claim 12, wherein transmitting the secondary beacon signal to the base station at the second power level comprises:

for each of the first threshold number of decrementations of the first and second power levels, transmitting the secondary beacon signal at the decreased secondary setting of the second power level and concurrently transmitting the primary beacon signal at the decreased primary setting of the first power level; and after decrementing the second power level to zero, transmitting the primary beacon signal at the new decreased primary setting of the first power level and refraining from transmitting the secondary beacon signal.

14. In an access terminal operating in a wireless communication system that includes a base station, wherein the access terminal and the wireless communication system both operate at least according to a IS-856, and the base station issues power-up and power-down commands according to inner-loop power-control protocols, a method comprising:

at the access terminal, receiving a trigger to begin transmitting an auxiliary pilot signal, wherein when the trigger is received an auxiliary power level is at zero and a primary power level is at a current primary power level; and responsive to thereafter receiving from the base station a post-trigger number of consecutive power-up commands, wherein the post-trigger number is no greater than a post-trigger threshold number:

for each of the received post-trigger number of consecutive power-up commands, incrementing the auxiliary power level by a non-zero incremental amount and transmitting the auxiliary pilot signal at the incremented auxiliary power level while concurrently holding the primary power level fixed and transmitting a primary pilot signal at the fixed current primary power level.

15. The method of claim 14, wherein receiving the trigger to begin transmitting the auxiliary pilot signal comprises:

at the access terminal, responsive to receiving from the base station a pre-trigger threshold number of consecutive power-up commands, ranging from a first to a last received power-up command:

for each of the received pre-trigger threshold number of consecutive power-up commands, incrementing the primary power level to an increased primary setting while holding the auxiliary power level fixed at zero and refraining from transmitting the auxiliary pilot signal, wherein the current primary power level is the increased primary setting achieved after the last received power-up command.

16. The method of claim 14, wherein receiving the trigger to begin transmitting the auxiliary pilot signal comprises determining that a payload of a data packet to be transmitted by the access terminal to the base station is larger than a threshold payload size.

17. The method of claim 14, further comprising:

responsive to receiving an immediately-subsequent power-up command from the base station following reception of the post-trigger number of consecutive power-up commands, and upon a determination that the post-trigger number is less than the post-trigger threshold number:

incrementing the auxiliary power level and transmitting the auxiliary pilot signal at the incremented auxiliary power level while concurrently holding the primary power level fixed and transmitting the primary pilot signal at the fixed current primary power level.

18. The method of claim 14, further comprising:

responsive to receiving an immediately-subsequent power-down command from the base station following reception of the post-trigger number of consecutive power-up commands, and upon a determination that the post-trigger number is less than the post-trigger threshold number:

decrementing the primary power level and transmitting the primary pilot signal at the decremented primary power level;

decrementing the auxiliary power level by computing a decrement as a function of the decremented primary power level and, concurrently with transmission of the primary pilot signal, transmitting the auxiliary pilot signal at the decremented auxiliary power level; and thereafter, responsive to receiving a power-control command selected from the group consisting of a power-up command and a power-down command, transmitting the primary pilot signal at a primary power level adjusted according to the received power-control command, and concurrently transmitting the auxiliary pilot signal at an auxiliary power level computed as a function of the adjusted primary power level.

19. The method of claim 14, further comprising:

responsive to subsequently receiving a power-control command from the base station following reception of the post-trigger number of consecutive power-up commands, the power-control command being selected from the group consisting of a power-up command and a power-down command, and upon a determination that the post-trigger number is equal to the post-trigger threshold number:

transmitting the primary pilot signal at a primary power level adjusted according to the received power-control command, and concurrently transmitting the auxiliary pilot signal at an auxiliary power level computed as a function of the adjusted primary power level.

20. The method of claim 14, further comprising:

responsive to subsequently receiving from the base station a third threshold number of consecutive power-down commands followed by an immediately-subsequent additional power-down command from the base station:

for each of the received third threshold number of consecutive power-down commands, (i) decrementing the primary power level and transmitting the primary pilot signal at the decremented primary power level, and (ii) decrementing the auxiliary power level by computing a decrement as a function of the decremented primary power level and, concurrently with transmission of the primary pilot signal, transmitting the auxiliary pilot signal at the decremented auxiliary power level; and thereafter, for the received additional power-down command, (iii) decrementing the primary power level and transmitting the primary pilot signal at the decremented primary power level, and (iv) independently of the primary power level, decrementing the auxiliary power level to zero, and refraining from transmitting the auxiliary pilot signal.

21. In an access terminal operating in a wireless communication system that includes a base station, wherein the access terminal and the wireless communication system both operate at least according to a IS-856, and the base station issues power-up and power-down commands according to inner-loop power-control protocols, an improvement comprising:

means for receiving a trigger to begin transmitting an auxiliary pilot signal, wherein when the trigger is received an auxiliary power level is at zero and a primary power level is at a current primary power level;

means for receiving from the base station a post-trigger number of consecutive power-up commands, wherein the post-trigger number is no greater than a post-trigger threshold number; and means for incrementing, responsive to reception of each of the post-trigger number of consecutive power-up commands, the auxiliary power level by a non-zero incremental amount, and for transmitting the auxiliary pilot signal at each incremented auxiliary power level while concurrently holding the primary power level fixed and transmitting the primary pilot signal at the fixed current primary power level.

22. The improvement of claim 21, wherein means for receiving the trigger to begin transmitting the auxiliary pilot signal comprise:

means for receiving from the base station a pre-trigger threshold number of consecutive power-up commands, ranging from a first to a last received power-up command; and means for incrementing, responsive to reception of each of the pre-trigger threshold number of consecutive power-up commands, the primary power level to an increased primary setting while holding the auxiliary power level fixed at zero and refraining from transmitting the auxiliary pilot signal, wherein the increased primary setting after the last received power-up command corresponds to the current primary power level.

23. The improvement of claim 21, wherein means for receiving the trigger to begin transmitting the auxiliary pilot signal comprise means for determining that a payload of a data packet to be transmitted by the access terminal to the base station is larger than a threshold payload size.

24. The improvement of claim 21, further comprising:

means for receiving an immediately-subsequent power-up command from the base station following reception of the post-trigger number of consecutive power-up commands;

means for determining that the post-trigger number is less than the post-trigger threshold number; and means for incrementing the auxiliary power level and transmitting the auxiliary pilot signal at the incremented auxiliary power level while concurrently holding the primary power level fixed and transmitting the primary pilot signal at the fixed current primary power level.

25. The improvement of claim 21, further comprising:

means for receiving an immediately-subsequent power-down command from the base station following reception of the post-trigger number of consecutive power-up commands;

means for determining that the post-trigger number is less than the post-trigger threshold number;

means for decrementing the primary power level and transmitting the primary pilot signal at the decremented primary power level;

means decrementing the auxiliary power level by computing a decrement as a function of the decremented primary power level and, concurrently with transmission of the primary pilot signal, transmitting the auxiliary pilot signal at the decremented auxiliary power level; and means for thereafter receiving a power-control command selected from the group consisting of a power-up command and a power-down command, and for concurrently transmitting both the primary pilot signal at a primary power level adjusted according to the received power-control command, and the auxiliary pilot signal at an auxiliary power level computed as a function of the adjusted primary power level.

26. The improvement of claim 21, further comprising:

means for subsequently receiving a power-control command from the base station following reception of the post-trigger number of consecutive power-up commands, the power-control command being selected from the group consisting of a power-up command and a power-down command;

means for determining that the post-trigger number is equal to the post-trigger threshold number; and means for transmitting the primary pilot signal at a power level adjusted according to the received power-control command and concurrently transmitting the auxiliary pilot signal at a power level computed as a function of the adjusted primary power level.

27. The improvement of claim 21, further comprising:

means for subsequently receiving from the base station a third threshold number of consecutive power-down commands followed by an immediately-subsequent additional power-down command;

means for, responsive to reception of each of the third threshold number of consecutive power-down command: (i) decrementing the primary power level and transmitting the primary pilot signal at the decremented primary power level, and (ii) decrementing the auxiliary power level by computing a decrement as a function of the decremented primary power level and, concurrently with transmission of the primary pilot signal, transmitting the auxiliary pilot signal at the decremented auxiliary power level; and means for, responsive to reception of the additional power-down command: (iii) decrementing the primary power level and transmitting the primary pilot signal at the decremented primary power level, and (iv) independently of the primary power level, decrementing the auxiliary power level to zero and refraining from transmitting the auxiliary pilot signal.

* * * * *